No. 655,829. Patented Aug. 14, 1900.
T. J. LOVETT.
CUSHIONED HORSESHOE.
(Application filed June 17, 1898.)
(No Model.)
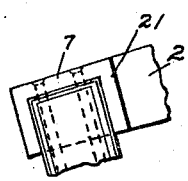
FIG. 10.
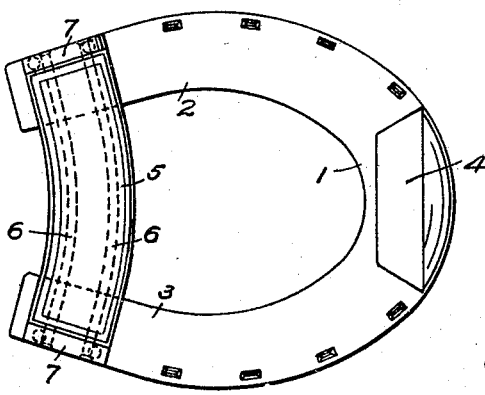
FIG. 1.
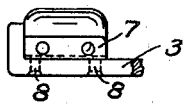
FIG. 2.
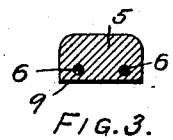
FIG. 3.
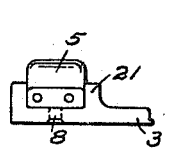
FIG. 11.
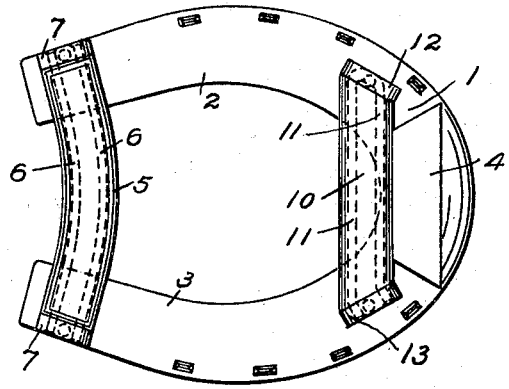
FIG. 4.
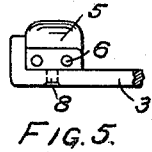
FIG. 5.
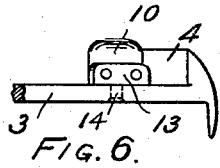
FIG. 6.
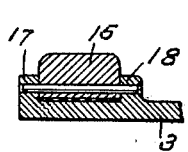
FIG. 12.
FIG. 8.
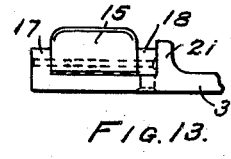
FIG. 13.
FIG. 9.
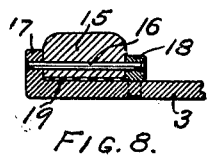
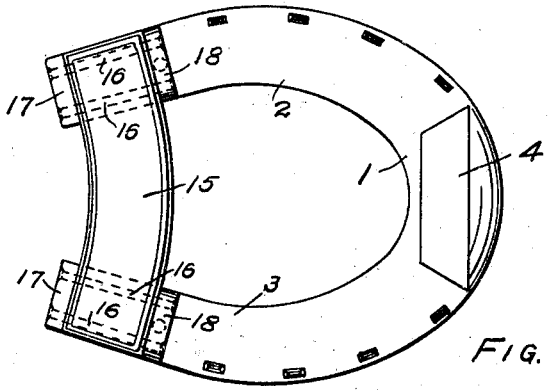
FIG. 7.
WITNESSES,
INVENTOR,
Thomas J. Lovett
BY Wilmarth H. Thurston
ATT'Y.

UNITED STATES PATENT OFFICE.

THOMAS J. LOVETT, OF CHICAGO, ILLINOIS, ASSIGNOR TO THE BUDD DOBLE TIRE COMPANY, OF NEW YORK, N. Y.

CUSHIONED HORSESHOE.

SPECIFICATION forming part of Letters Patent No. 655,829, dated August 14, 1900.

Application filed June 17, 1898. Serial No. 683,695. (No model.)

*To all whom it may concern:*

Be it known that I, THOMAS J. LOVETT, of Chicago, county of Cook, State of Illinois, have invented certain new and useful Improvements in Horseshoes; and I do hereby declare the following specification, taken in connection with the accompanying drawings, forming a part of the same, to be a full, clear, and exact description thereof.

The invention relates to means for preventing jars and shocks to the hoofs of horses when traveling over hard or rough pavements and for preventing slipping when traveling over smooth pavements; and it consists in the features and combinations hereinafter described and claimed.

Referring to the drawings, Figure 1 is a plan view of a shoe embodying the invention. Figs. 2 and 3 are details of said shoe. Fig. 4 is a plan view of a modified form of the invention. Figs. 5 and 6 are details thereof. Fig. 7 is a plan view of another modification. Fig. 8 is a detail thereof. Fig. 9 is a detail of a modification, and Figs. 10, 11, 12, and 13 are details of other modifications.

Referring to Figs. 1, 2, and 3, the base-plate 1 of the shoe is provided with the usual curved sides 2 and 3 and is also preferably provided with a toe-calk 4. In order to deaden the shock as the horse's foot strikes the ground and also to prevent slipping, a cushion-block 5 is secured to the under side of the base-plate, said block extending from side to side of the shoe. The cushion-block may be formed of rubber, leather, felt, or composition, or several materials may be united in the same block; but it is preferred to form said block of rubber. The block is preferably located near the heel of the shoe, as shown in the drawings. The block 5 is secured to the shoe by means of wires 6, which pass through the block and are secured to the base-plate. As shown in these views, the wires pass through the block from side to side of the shoe and are secured to the base-plate by means of studs 7, located at the ends of the block, into which studs the ends of the wires 6 pass. The studs may be secured to the base-plate by means of pins 8, formed thereon, which pins are passed through holes in the base-plate 1 and headed down upon the upper surface of said plate. When the block 5 is formed of rubber, it is preferred to provide a layer 9 of metal, canvas, leather, or other suitable material above the block, so that the frog of the foot will not be brought into contact with the rubber.

In Figs. 4, 5, and 6 is shown a shoe provided with an additional block 10, extending from side to side of the shoe and situated in the toe region of the shoe, so that the toe as well as the heel will be cushioned. This block 10 is secured to the plate 1 by means of a wire 11, which is looped through a stud 12 and has its strands passed through the block and into a second stud 13 at the opposite end of the block. The studs are secured to the plate 1 by pins 14, which pass through the plate and are headed down on the upper side.

In Figs. 7 and 8 is shown a modified arrangement of the wires for securing the cushion-block to the base-plate. In this construction the block 15 is secured to the base-plate 1 by means of wires 16, which pass transversely through the block and into the heel-calks 17 upon one side of the block and into studs 18 upon the other side of the block. A layer 19 of suitable material is provided above the block 15 to protect the frog when the block is made of rubber.

Instead of securing the studs to the base-plate by means of pins said studs may be made integral with the base-plate, as shown in Figs. 10 and 12. The studs may, if desired, be protected from shocks and wear by lugs, as 21, Figs. 11 and 13, formed integral with the base-plate and preferably projecting below the studs.

The heel-calk, stud, and projecting lug may all be formed integral with the base-plate and with each other, as shown in Fig. 10, or other variations in the construction may be made without departing from the invention.

With the constructions and arrangements above described the heel of the foot will be protected from shocks and jars, and in case the block is located under the frog that part of the foot will be protected from stones, &c., without interfering with the free ventilation of the hoof.

In case the wires for securing the blocks to the shoes extend from side to side of the shoe, as in Figs. 1 and 4, said wires will stiffen the block and aid in resisting any force tending to bend said block up against the frog of the foot.

In order to stiffen the block when it is secured to the shoe as in Fig. 7 or to further stiffen it when secured as in Figs. 1 and 4, a plate 20, Fig. 9, may be embedded in the block, if found desirable. This plate may be of any suitable material, but is preferably of metal and provided with perforations through which the material of the block passes and serves to hold the plate firmly in place.

What I claim as my invention, and desire to secure by Letters Patent, is—

1. A horseshoe having a base-plate, a cushion-block extending from side to side of the shoe, a stiffening-plate embedded in said block, and one or more wires passing through said block, said wires being secured to the base-plate, substantially as described.

2. A horseshoe having a base-plate, a cushion-block extending from side to side of the shoe, studs projecting from the base-plate, one or more wires passing through said block and into said studs, substantially as described.

3. A horseshoe having a base-plate, a block of rubber extending from side to side of the shoe, a layer of protecting material above the rubber, and one or more wires extending through said block, said wires being secured to the base-plate substantially as described.

THOMAS J. LOVETT.

Witnesses:
M. S. MACKENZIE,
M. J. FROST.